Nov. 14, 1933.  W. A. BLUME  1,935,348

FRICTION BLOCK

Filed May 23, 1931  2 Sheets-Sheet 1

Witness:
William P. Kilroy

Inventor:
William A. Blume
By Wm. O. Bell  Atty

Nov. 14, 1933.          W. A. BLUME          1,935,348
FRICTION BLOCK
Filed May 23, 1931          2 Sheets-Sheet 2

Patented Nov. 14, 1933

1,935,348

UNITED STATES PATENT OFFICE 1,935,348

FRICTION BLOCK

William A. Blume, Detroit, Mich., assignor to American Brakeblok Corporation, New York, N. Y., a corporation of New York Application May 23, 1931. Serial No. 539,532

3 Claims. (Cl. 188—251)

This invention relates to friction blocks for friction brakes and while it is especially adapted for use in automotive brakes it can be used satisfactorily in many other kinds of brake assemblies.

One of the objects of the invention is to provide a novel brake block having a composition body with a skeleton metal reenforcing and supporting back united therewith and forming a strong and substantial block which will resist the strains of service and remain intact to the limit of wear.

Another object is to provide a skeleton reenforcing back made of an alloy of aluminum which is light in weight but has sufficient strength to form a suitable support for the composition body of the block and sufficient flexibility to enable it to be fitted to and secured solidly on an arcuate support.

And a further object of the invention is to anchor the devices whereby the block is fastened to a shoe or support in the back in such a manner that the body of the block may wear down to the back without contacting with the fastening devices.

And a still further object is to provide the back with openings of novel form and arrangement which will permit the body composition material to flow thereinto under pressure and make anchoring engagement with the back.

In the accompanying drawings I have illustrated selected embodiment of the invention and referring thereto Fig. 1 is an edge view of the block embodying the invention.

Figs. 2 and 3 are sectional views on the lines 2—2 and 3—3 of Fig. 4.

Figure 1:
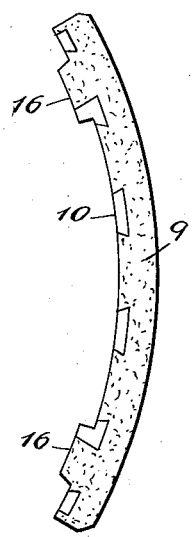
Figure 2:
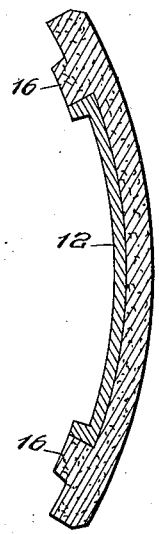
Figure 3:
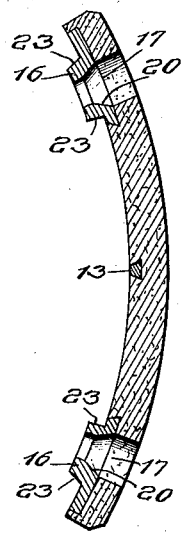
Figure 4:
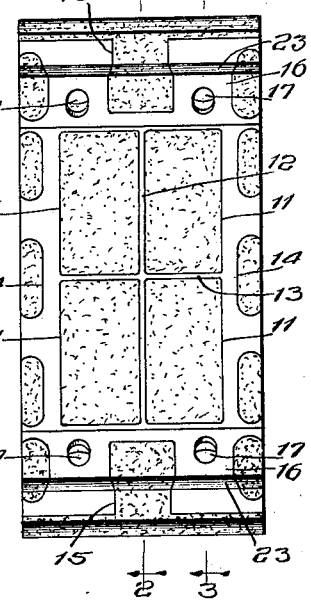
Fig. 4 is a back view of the block shown in Fig. 1.
Figure 5:
Fig. 5 is an edge view showing another form of back.
Figure 6:
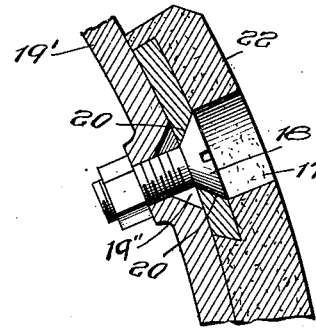
Figs. 6, 7 and 8 are detail enlarged sectional views.
Figure 7:
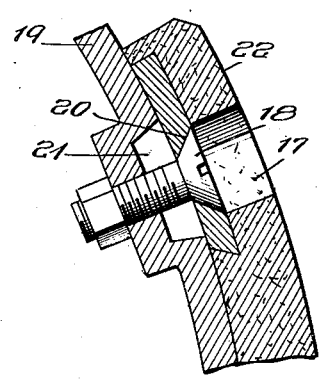
Figure 8:
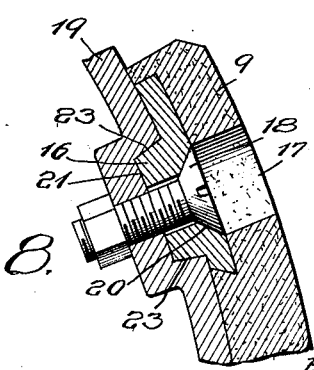

Referring to Figs. 1 to 8 of the drawings, 9 is the body and 10 is the back of the block. The body is made of any composition suitable for the purpose and it is molded or otherwise applied to the back which is preferably made of a suitable alloy of aluminum which is non-warping, non-brittle, hard and somewhat flexible. The back is of skeleton form and it has four openings 11 arranged in adjacent relation between its sides and ends and separated by a long rib 12 and a transverse rib 13. Openings 14 in the form of recesses are located in the side marginal edges of the back and openings 15 in the form of recesses are provided in the ends of the back. These margins are filled with the body material in the molding operation, and the marginal edges of the skeleton back are preferably beveled to make interlocking engagement with the body. The body is thus securely and solidly united with the back from end to end and from side to side thereof to provide a strong and substantial block which will resist the strains of service tending to pull the body away from the back. I provide the block with a transverse lug 16 adjacent each end and on its back extending entirely across the block. This lug is formed partly of the body and partly of the back and it extends through that part of the back having the recess 15. Openings 17 for the bolts 18, which fasten the block to the support or shoe 19, are provided in the lug parts of the block and these openings are preferably countersunk at 20 in the back to receive the heads of the bolts so that they will lie flush with the inner face of the back. With the heads of the bolts countersunk they will not become exposed in the wear of the block until the body has worn down to the back and the block should be replaced. The lugs 16 will fit in grooves or recesses 21 in the support 19 and assist in holding the block on its support. A block 22, Fig. 5, without ribs 16 may be made for a support 19', Fig. 6, which is not provided with grooves 21, and if this block 22 is used on a shoe 19 having a groove 21 it will bridge the groove, Fig. 7, or if the shoe 19' Fig. 6, has a countersink 19" the block 22 will bridge the countersink. The lugs 16 are composed partly of the metal of the back and partly of the body composition material and the metal parts of the shoulders 23 will engage adjacent walls of the grooves 21 and cooperate with the bolts in holding the block in fixed position on its support.

Figure 9:
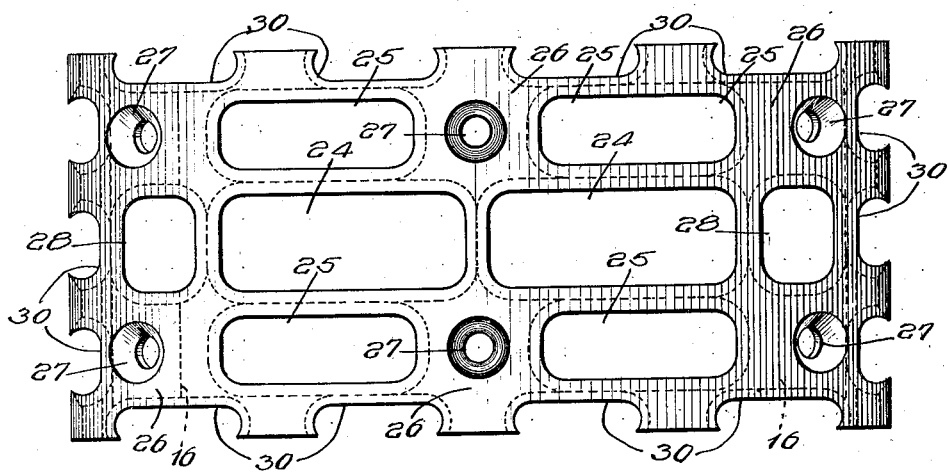
Fig. 9 is a plan view showing another form of back.
Figure 10:
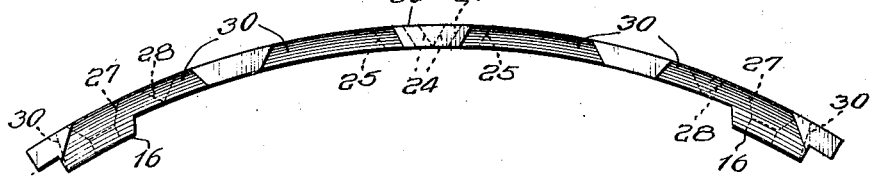
Fig. 10 is an edge view of a block with a back as shown in Fig. 9.
Figure 11:
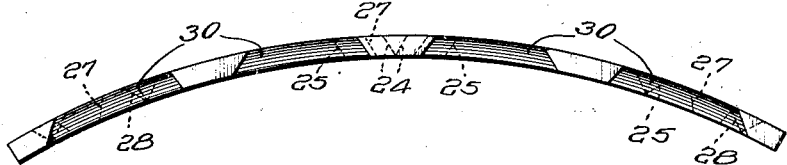
Fig. 11 is a view similar to Fig. 10 omitting the lugs on the back.

In Figs. 9 and 10 I have shown another form of back which can be used on larger blocks, this back having two large openings 24 centrally disposed, with four flanking openings 25. The openings 25 at each side of the back are spaced apart by metal sections 26 which have countersunk bolt holes 27. There is an opening 28 at each end portion of the shoe and metal sections 26 on each side thereof provided with bolt holes 27.

Recesses 30 are provided in the sides and end edges of the back. All edges of the back are beveled to make anchoring engagement with the body.

The invention provides a strong and substantial protective back for the composition body of the block which can be easily made as a casting or by stamping and with which the composition body is securely and solidly united. The back is sufficiently strong and rigid to maintain its shape but it is not brittle and will permit slight bending to adapt it to the surface of the support upon which it is mounted. The back not only protects the body in handling but it holds the body intact during service of the block so that the full wear of the block may be obtained before it is replaced. The invention enables the use of tapered head bolts which are countersunk in the back to lie flush with the inner surface of the back at the wear line of the body. This insures that the bolt head will not project above the back into the body to contact with the part to be braked before the body is worn to the limit of wear, and thereby produces a greater efficiency of service of the block and prevents squealing and other unpleasant noises.

I have shown the invention in forms which are satisfactory for practical commercial use but it may be necessary or desirable to change the construction and arrangement of parts in adapting the invention for blocks of other forms and for other purposes and to satisfy different conditions and I reserve the right to make all such changes within the scope of the following claims.

I claim:

1. A friction block comprising a composition body and a supporting back united therewith and having four large openings between its sides and ends, said openings being separated by a longitudinal rib and a transverse rib and having a continuous section thereabout to which said ribs are connected, the sides and ends of the back having recesses therein, and all the edges of the back being beveled to form anchoring engagement with the body.

2. A friction block comprising a composition body and a skeleton back embedded therein, said block having transverse lugs on its back adjacent its ends to engage grooves in a supporting shoe and said lugs being formed partly of the body and partly of the back.

3. A friction block comprising a composition body and a skeleton supporting back united therewith, said back having two large centrally disposed openings therein, said back having other openings therein arranged in pairs with said pairs of openings respectively disposed intermediate each of the side edges of the back and the centrally disposed openings therein with the openings of each pair spaced from each other and the ends of the back, said back having other openings disposed intermediate the ends of the back and the centrally disposed openings, solid sections in the back adjacent the corners thereof, and other solid sections disposed medially of the back intermediate the openings of each pair of openings, said solid sections having bolt openings therein to receive bolts for securing the block on a support.

WILLIAM A. BLUME.